(12) United States Patent
Huang

(10) Patent No.: US 12,354,570 B2
(45) Date of Patent: Jul. 8, 2025

(54) DISPLAY SCREEN ADJUSTMENT METHOD, STORAGE MEDIUM AND TERMINAL DEVICE

(71) Applicant: SHENZHEN TCL DIGITAL TECHNOLOGY LTD., Shenzhen (CN)

(72) Inventor: Zhaowen Huang, Shenzhen (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 0 days.

(21) Appl. No.: 17/754,729

(22) PCT Filed: Aug. 26, 2020

(86) PCT No.: PCT/CN2020/111299
§ 371 (c)(1),
(2) Date: Apr. 10, 2022

(87) PCT Pub. No.: WO2021/068666
PCT Pub. Date: Apr. 15, 2021

(65) Prior Publication Data
US 2025/0095608 A1 Mar. 20, 2025

(30) Foreign Application Priority Data

Oct. 10, 2019 (CN) .......................... 201910959708.2

(51) Int. Cl.
G09G 5/38 (2006.01)
(52) U.S. Cl.
CPC .......... G09G 5/38 (2013.01); G09G 2340/045 (2013.01); G09G 2340/0492 (2013.01); G09G 2340/14 (2013.01); G09G 2360/18 (2013.01)

(58) Field of Classification Search
CPC ........... G09G 2360/18; G09G 2340/14; G09G 2340/0492; G09G 2340/045; G09G 5/38; G06T 3/40
See application file for complete search history.

(56) References Cited

U.S. PATENT DOCUMENTS

2006/0181538 A1* 8/2006 Kim .................... G09G 5/14
345/502
2009/0141045 A1* 6/2009 Jackson ................ G09G 5/391
345/658

(Continued)

FOREIGN PATENT DOCUMENTS

CN 103399694 A 11/2013
CN 104615396 A 5/2015

(Continued)

OTHER PUBLICATIONS

International Search Report in international application No. PCT/CN2020/111299, mailed on Nov. 30, 2020.

(Continued)

Primary Examiner — Kee M Tung
Assistant Examiner — Nauman U Ahmad
(74) Attorney, Agent, or Firm — PV IP PC; Wei Te Chung

(57) ABSTRACT

A display screen adjustment method, a storage medium and a terminal device. The method includes: acquiring a target region of a display preview picture; determining a display angle and display scale corresponding to the display preview picture according to the target region; and then determining a rotation angle of the display screen, and adjusting the display screen according to the rotation angle. By determining a target region, and determining a display angle and display scale, the scale of a finally output picture can be determined according to a data signal corresponding to the display preview picture, such that the scale of the output (Continued)

picture is adapted to the display screen, thus improving the display effect. Moreover the display screen can be adapted to switching at different angles, the display screen is at an optical display angle, and a terminal can be adapted to application scenarios of different display scales.

16 Claims, 5 Drawing Sheets

(56) References Cited

U.S. PATENT DOCUMENTS

| | | | |
|---|---|---|---|
| 2010/0277506 | A1 | 11/2010 | Yao |
| 2012/0044270 | A1* | 2/2012 | Arkhipov ............... G09G 3/32 |
| | | | 345/690 |
| 2012/0327061 | A1* | 12/2012 | Sirpal ................. G06F 3/0483 |
| | | | 345/211 |
| 2014/0176424 | A1* | 6/2014 | Hung .................... G09G 5/006 |
| | | | 345/156 |
| 2015/0206284 | A1* | 7/2015 | Yang .................... G06F 1/1681 |
| | | | 345/659 |
| 2015/0365625 | A1* | 12/2015 | Ishizaki ................ G09G 5/227 |
| | | | 348/581 |
| 2016/0364017 | A1* | 12/2016 | Wang ...................... G09G 3/20 |
| 2017/0131793 | A1* | 5/2017 | Wang ...................... G06F 3/017 |
| 2017/0221181 | A1* | 8/2017 | Feng ....................... G09G 5/00 |
| 2020/0234470 | A1* | 7/2020 | Chen ...................... G09G 5/02 |

FOREIGN PATENT DOCUMENTS

| | | |
|---|---|---|
| CN | 104731311 A | 6/2015 |
| CN | 106205531 A | 12/2016 |
| CN | 109308153 A | 2/2019 |

OTHER PUBLICATIONS

Written Opinion of the International Searching Authority in international application No. PCT/CN2020/111299 mailed on Nov. 30, 2020.
Chinese Office Action issued in corresponding Chinese Patent Application No. 201910959708.2 dated Dec. 20, 2021, pp. 1-6.
European Search Report in European application No. 20874380.7, mailed on Oct. 20, 2023.

* cited by examiner

FIG. 7

```
┌─────────────────────────────────────────────────────────────────────┐   ┌─ S11
│ Select a number of starting pixel points of the display preview picture, the │ /
│ starting pixel points are intersections of a horizontal line and a vertical line in │
│ the display preview picture, and the color values of the starting pixel points are │
│ equal to the default value.                                         │
└─────────────────────────────────────────────────────────────────────┘
                                  │
                                  ▼
┌─────────────────────────────────────────────────────────────────────┐
│ Determine a first pixel point in a clockwise direction and a second pixel point │
│ in a counterclockwise direction according to starting from the starting pixel │
│ points, traverse an edge of the display preview picture in the clockwise │
│ direction and the counterclockwise direction with a preset step size, the color │─ S12
│ value of the first pixel point and the color value of the second pixel point are │
│ equal to the default value, the color value of a next pixel point of the first pixel │
│ point on the side of the display preview picture and the color value of a next │
│ pixel point of the second pixel point on the side of the display preview picture │
│ are not equal to the default value either.                          │
└─────────────────────────────────────────────────────────────────────┘
                                  │
                                  ▼
┌─────────────────────────────────────────────────────────────────────┐   ┌─ S13
│ Determine the target region according to the first pixel point and the second │ /
│ pixel point.                                                        │
└─────────────────────────────────────────────────────────────────────┘
```

FIG. 8

DISPLAY SCREEN ADJUSTMENT METHOD, STORAGE MEDIUM AND TERMINAL DEVICE

CROSS REFERENCE TO RELATED APPLICATIONS

This disclosure claims priority to a Chinese patent application filed on Oct. 10, 2019, having an application number of "2019109597082" and title of "A method for adjusting a display screen, a storage medium and a terminal device", the entire contents of which are incorporated by reference in this disclosure.

BACKGROUND OF THE INVENTION

1. Field of the Invention

This disclosure relates to the technical field of intelligent terminals, and in particular, to a display screen adjustment method, a storage medium and a terminal device.

2. Description of the Prior Art

As the cross-platform capability of the application of embedded terminal equipment becomes more and more powerful, when the application of embedded terminal equipment is used across platforms, the terminal device (for example, mobile phone, tablet, TV, etc.) needs to be able to adapt to the application capabilities, especially screen adaptation. Screen adaptation mainly includes interactive interface adaptation and display screen adaptation. The current display screen adaptation generally means that the terminal device switches to the display mode of the display screen according to the state of the terminal device when the user is using the terminal device, that is, switching between horizontal screen display and vertical screen display. However, with the increasingly differentiated growth of applications and user needs, it is necessary to continuously adapt to application scenarios with different display scales to improve the display effect.

BRIEF SUMMARY OF THE INVENTION

A technical problem solved by embodiment of this disclosure includes a display screen adjustment method, a storage medium and a terminal device in view of the deficiencies of the prior art.

According to an embodiment of this disclosure, a display screen adjustment method is disclosed. In a first aspect, the display screen adjustment method includes: acquiring a target region of a display preview picture, wherein the display preview picture is a display picture formed by outputting a to-be-displayed image to a display screen, the target region is a non-overlapping region between an image region and the display screen in the display preview picture, and a color value of each pixel point in the target region is equal to a default value; determining a display angle and a display scale corresponding to the display preview picture according to the target region; determining a rotation angle of the display screen according to the display angle and the display scale; and adjusting the display screen according to the rotation angle.

According to an embodiment of this disclosure, the target region includes a set of sub-region groups at least, each sub-region group includes two sub-regions, the two sub-regions are symmetrically distributed on both sides of the image region.

According to an embodiment of this disclosure, the to-be-displayed image includes a frame image acquired by analyzing a video signal, and the display preview picture includes a preview picture acquired by intercepting the frame image corresponding to the to-be-displayed image in a frame buffer.

According to an embodiment of this disclosure, the color value includes a transparency, a red channel value, a green channel value, and a blue channel value.

According to an embodiment of this disclosure, the process of acquiring the target region of the display preview picture includes: selecting a number of starting pixel points of the display preview picture, the starting pixel points are intersections of a horizontal line and a vertical line in the display preview picture, and the color values of the starting pixel points are equal to the default value; determining a first pixel point in a clockwise direction and a second pixel point in a counterclockwise direction according to starting from the starting pixel points, traversing an edge of the display preview picture in the clockwise direction and the counterclockwise direction with a preset step size, the color value of the first pixel point and the color value of the second pixel point are equal to the default value, the color value of a next pixel point of the first pixel point on the side of the display preview picture and the color value of a next pixel point of the second pixel point on the side of the display preview picture are not equal to the default value either; and determining the target region according to the first pixel point and the second pixel point.

According to an embodiment of this disclosure, the next pixel point of the first pixel point includes a first pixel point located after the first pixel point according to a traversing direction, and the next pixel point of the first pixel point is located on the side of the display preview picture; and the next pixel point of the second pixel point includes a first pixel point located after the second pixel point according to the traversing direction, and the next pixel point of the second pixel point is located on the side of the display preview picture.

According to an embodiment of this disclosure, the process of determining the target region according to the first pixel point and the second pixel point includes: determining a candidate region according to the first pixel point and the second pixel point, and traversing all color values of each pixel points in the candidate region; taking the candidate region as the target region when the color values of all the pixel points included in the candidate region are default values; and performing the process of selecting the starting pixel points of the display preview picture when there is a pixel point whose color value is not equal to the default value in the candidate region.

According to an embodiment of this disclosure, the process of determining a candidate region according to the first pixel point and the second pixel point includes: determining whether the first pixel point and the second pixel point pass through a number of vertices of the display preview picture; when neither the first pixel point nor the second pixel point passes through one of the vertices of the display preview picture, a right triangle with the starting pixel point, the first pixel point and the second pixel point as vertices is taken as the candidate region; and when the first pixel point or the second pixel point passes through one of the vertices of the display preview picture, an rectangle with the starting pixel point, the first pixel point, the second pixel point and the passed vertex as vertices is taken as the candidate region.

According to an embodiment of this disclosure, the display angle includes a inclination angle of a connecting line of the first pixel point and the second pixel point in a sub-region of the target region with respect to a longitudinal direction.

According to an embodiment of this disclosure, the display scale includes the side length scale of adjacent sides in the image region of the display preview picture.

According to an embodiment of this disclosure, the process of determining a display angle and a display scale corresponding to the display preview picture according to the target region includes: determining the image region included in the display preview picture according to the target region; determining a first side according to the target region and the image region, and the first side is a common side of the target region and the image region; determining a second side according to the first side, and the second side is an edge of the image region and intersects the first side; and determining the display angle and the display scale according to the display preview picture according to the first side and the second side.

According to an embodiment of this disclosure, the process of determining the rotation angle of the display screen according to the display angle and the display scale includes: when the display angle is equal to a first angle threshold, comparing a screen scale of the display screen with a scale threshold; when the screen scale of the display screen is greater than the scale threshold, the rotation angle is the first angle threshold, wherein a second angle threshold is smaller than the first angle threshold; when the screen scale is smaller than or equal to the scale threshold, determining the rotation angle according to the display scale and the screen scale, the display scale is greater than or equal to the inverse of the screen scale, the rotation angle is the first angle threshold, the display scale is smaller than the inverse of the screen scale, and the rotation angle is the second angle threshold.

According to an embodiment of this disclosure, the second angle threshold is greater than the first angle threshold, and the difference between the second angle threshold and the first angle threshold is equal to 90°.

According to an embodiment of this disclosure, the process of determining the rotation angle of the display screen according to the display angle and the display scale includes: when the display angle is smaller than a first angle threshold and greater than a second angle threshold, comparing the display scale with the screen scale; when the display scale is greater than or equal to the screen scale, the rotation angle is the display angle; and when the display scale is smaller than the screen scale, the rotation angle is the first angle threshold minus the display angle.

According to an embodiment of this disclosure, the process of determining the rotation angle of the display screen according to the display angle and the display scale includes: when the display angle is equal to a second angle threshold, comparing the screen scale to a scale threshold; when the screen scale is smaller than or equal to the scale threshold, the rotation angle is a first angle threshold; and when the screen scale is greater than the scale threshold, the display screen is adjusted according to the display scale and the screen scale, the display scale is greater than or equal to the inverse of the screen scale, the rotation angle is the first angle threshold, the display scale is smaller than the inverse of the screen scale, and the rotation angle is the second angle threshold.

According to an embodiment of this disclosure, a computer-readable storage medium is disclosed. In a second aspect, the computer-readable storage medium stores one or more programs, and the one or more programs can be executed by one or more processors to realize the steps of the display screen adjustment method mentioned above.

According to an embodiment of this disclosure, a terminal device is disclosed. In a third aspect, the terminal device includes: a processor, a memory and a communication bus; a computer-readable program executable by the processor is stored on the memory; the communication bus implements connection communication between the processor and the memory; and when the processor executes the computer-readable program, the steps in the display screen adjustment method mentioned above.

An embodiment of this disclosure achieves an advantageous effect that comparing with the prior art, this disclosure provides a display screen adjustment method, the display screen adjustment method includes acquiring a target region of a display preview picture, determining a display angle and a display scale corresponding to the display preview picture according to the target region; determining a rotation angle of the display screen according to the display angle and the display scale, and adjusting the display screen according to the rotation angle. In this disclosure, the target region is determined by the display preview picture, and the display angle and the display scale are determined according to the target region to determine the rotation angle. In this way, the scale of a finally output picture can be determined according to a data signal corresponding to the display preview picture, such that the scale of the output picture is adapted to the display screen, thus improving the display effect. Moreover the display angle is determined according to the target region, and the rotation angle is then determined according to the display angle, such that the display screen can be adapted to switching at different angles, the display screen is at an optical display angle, and a terminal can be adapted to application scenarios of different display scales.

BRIEF DESCRIPTION OF THE DRAWINGS

FIG. 7 is a fourth schematic view of a target region of the display screen adjustment method in an embodiment of this disclosure.

FIG. 8 is a flowchart of step S10 of the display screen adjustment method in an embodiment of this disclosure.

DETAILED DESCRIPTION OF THE
PREFERRED EMBODIMENTS this disclosure provides a display screen adjustment method, a storage medium and a terminal device. In order to make the objectives, technical solutions and advantages of this disclosure clearer, this disclosure will be described in further detail below with reference to the accompanying drawings and embodiments. It should be understood that the specific embodiments described herein are only used to explain this disclosure, but not to limit this disclosure.

It will be understood by those skilled in the art that the singular forms "a", "an", "the" and "the" as used herein can include the plural forms as well, unless expressly stated otherwise. It should be further understood that the word "comprising" used in the specification of this disclosure refers to the presence of the stated features, integers, steps, operations, elements and/or components, but does not preclude the presence or addition of one or more other features, Integers, steps, operations, elements, components and/or groups thereof. It will be understood that when we refer to an element as being "connected" or "coupled" to another element, it can be directly connected or coupled to the other element or intervening elements may also be present. Furthermore, "connected" or "coupled" as used herein may include wirelessly connected or wirelessly coupled. As used herein, the term "and/or" includes all or any element and all combination of one or more of the associated listed items.

It will be understood by those of ordinary skill in the art that, unless otherwise defined, all terms (including technical and scientific terms) used herein have the same meaning as commonly understood by one of ordinary skill in the art to which this disclosure belongs. It should also be understood that terms, such as those defined in a general dictionary, should be understood to have meanings consistent with their meanings in the context of the prior art and, unless specifically defined as herein, should not be interpreted in idealistic or overly formal meaning to explain.

This disclosure will be further illustrated below through the description of the embodiment in conjunction with the accompanying drawings.

Figure 1:
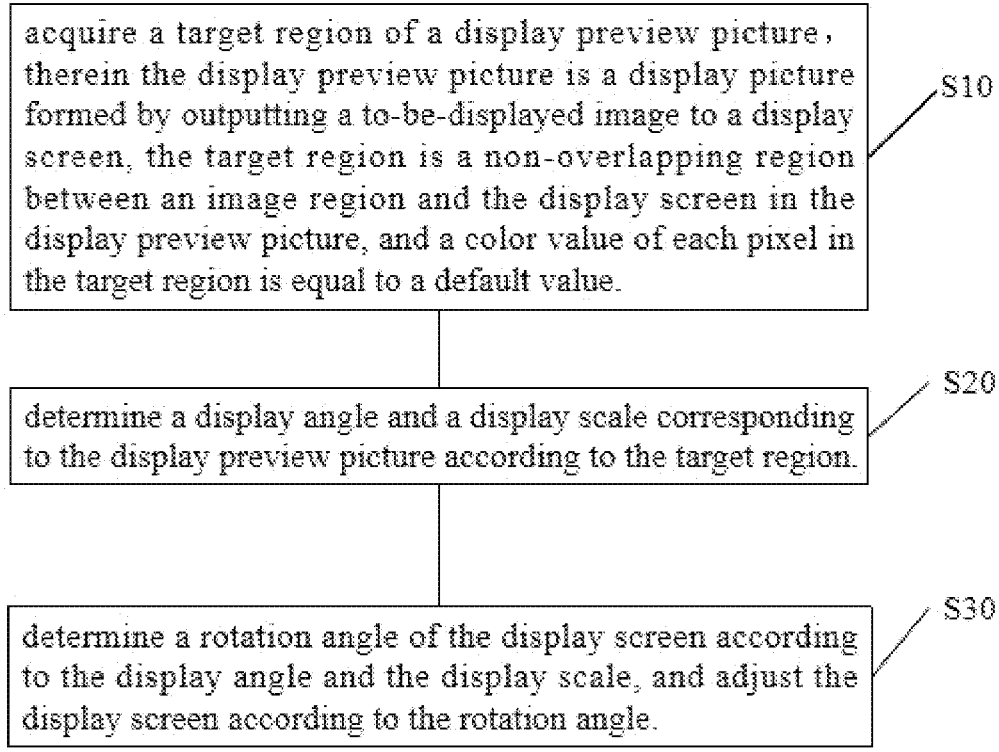
FIG. 1 is a flowchart of a display screen adjustment method in an embodiment of this disclosure.

This embodiment provides a display screen adjustment method, as shown in FIG. 1, the display screen adjustment method includes:

S10. acquire a target region of a display preview picture.

Especially, the display preview picture is a display picture formed by outputting a to-be-displayed image to a display screen. The to-be-displayed image may be acquired by analyzing a video signal received. A video frame corresponding to the video signal, for example, the display preview picture is the image shown in FIG. 2. The display preview picture is the picture that a terminal device needs to output to the display screen finally. The display preview picture can be acquired by intercepting a frame image in a frame buffer, wherein the frame image is a frame image corresponding to the to-be-displayed image. The video signal may be output to the terminal device by an application program embedded in the terminal device, for example, Tencent Video, iQiyi, etc. The video signal can also be synchronized to the terminal device by an external device, such as a mobile phone, a tablet computer, etc. The video signal may also be received by the terminal device through a signal interface set by the terminal device. The signal interface of the terminal device can be connected with various signal sources to receive image signals input by different signal sources, The signal sources may include but are not limited to HDMI signal sources, VGA signal sources, ATV signal sources, DTV signal sources, YPbpr signal sources, AV signal sources, etc. These different signal source inputs can produce image signals in a variety of formats.

Further, color value is used to represent a color value of each of a number of pixel points, and the color values may be represented by 32-bit hexadecimal data. For example, the display preview picture is in JPG/PNG/BMP format, and the color value of each pixel point in the display preview picture is ARGB 32-bit data. Therein A represents a transparency, R is a red channel value, G is a green channel value, and B is a blue channel value. Then, the A value, R value, G value, and B value of each pixel point in the display preview picture are all represented by 8-bit hexadecimal data, and the color values of the 32-bit hexadecimal data of the pixel points can be determined. Meanwhile, in a possible implementation manner of this embodiment, the color value of each pixel point corresponds to a color identification value (for example, a 32-bit hexadecimal identification value). A position information of the pixel point can correspond to a two-dimensional array identifier (for example, color [X] [Y], X represents a horizontal coordinate in a coordinate system created according to resolution of the display screen, and Y represents a vertical coordinate in the coordinate system created according to resolution of the display screen), and each two-dimensional array identifier corresponds to a color identifier value. Thus, an image color data displayed on the display preview picture can be identified by a two-dimensional array identification array. Each element in the two-dimensional array identification array corresponds to the color value of a pixel point, and position of the element in the two-dimensional array identification array corresponds to a two-dimensional array identification of the pixel point, That is, the position of the element in the two-dimensional array identification array corresponds to the position of the pixel point in the display preview picture, so that the color value of each pixel point in the display preview screen can be quickly determined according to the two-dimensional array identification array, which is convenient for identification of the target region.

Figure 2:
FIG. 2 is a schematic view of a display preview picture of the display screen adjustment method in an embodiment of this disclosure.
Figure 3:
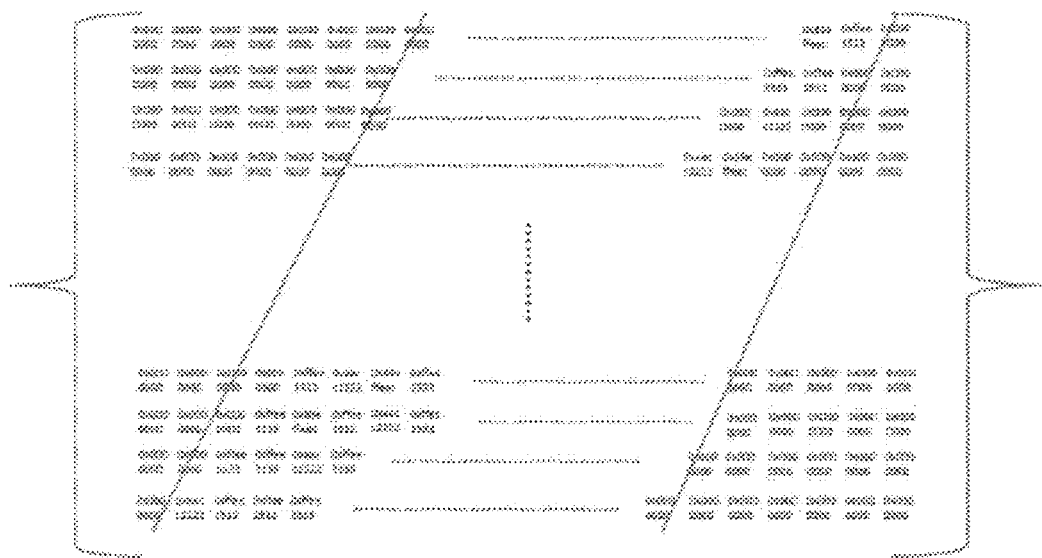
FIG. 3 is a schematic view of a two-dimensional array identification array corresponding to the display preview picture of the display screen adjustment method in an embodiment of this disclosure.

For example: As shown in FIG. 2 of the display preview picture, assuming that the display resolution is 1920*1080, taking an upper left vertex of the display preview picture as the origin, a horizontal direction is a X-axis direction, and a vertical direction is a Y-axis direction, then the two-dimensional array identification array corresponding to the display preview picture can be as shown in FIG. 3. For the two-dimensional array identification array, the value corresponding to each element in the two-dimensional array identification array is the color value of the pixel point corresponding to the element. And the two-dimensional array identifier color[X][Y] corresponding to each element in the two-dimensional array identifier array has X<1920 and Y<1080. For example, the color identifier corresponding to color[0][1] is 0x00000000, indicating that the pixel point (0,1) in the display preview picture is black.

Figure 4:
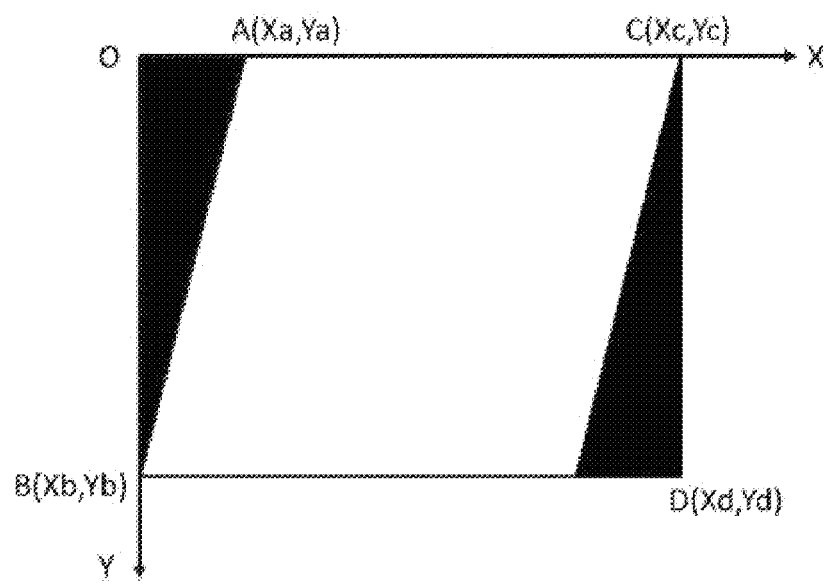
FIG. 4 is a schematic view of a target region of the display screen adjustment method in an embodiment of this disclosure.
Figure 5:
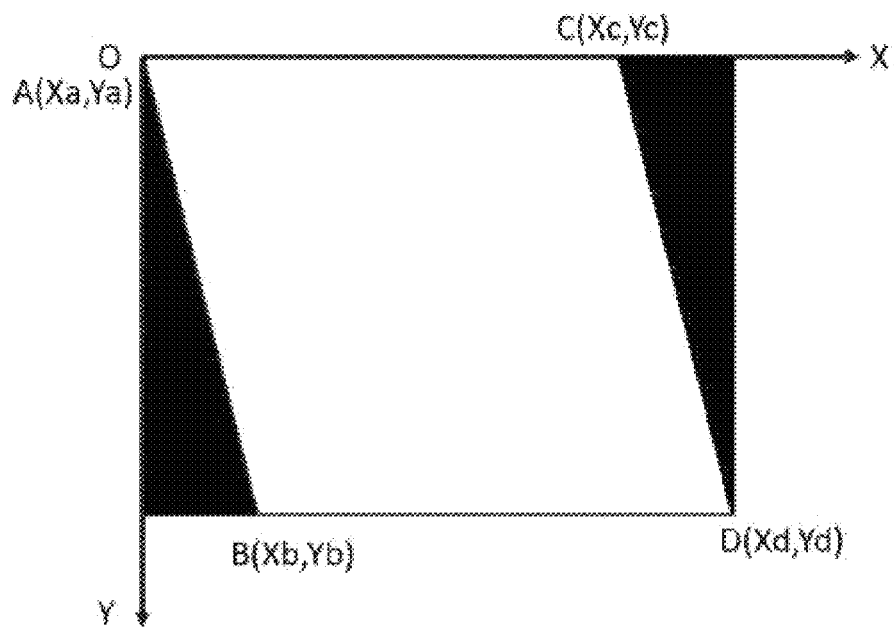
FIG. 5 is another schematic view of a target region of the display screen adjustment method in an embodiment of this disclosure.
Figure 6:
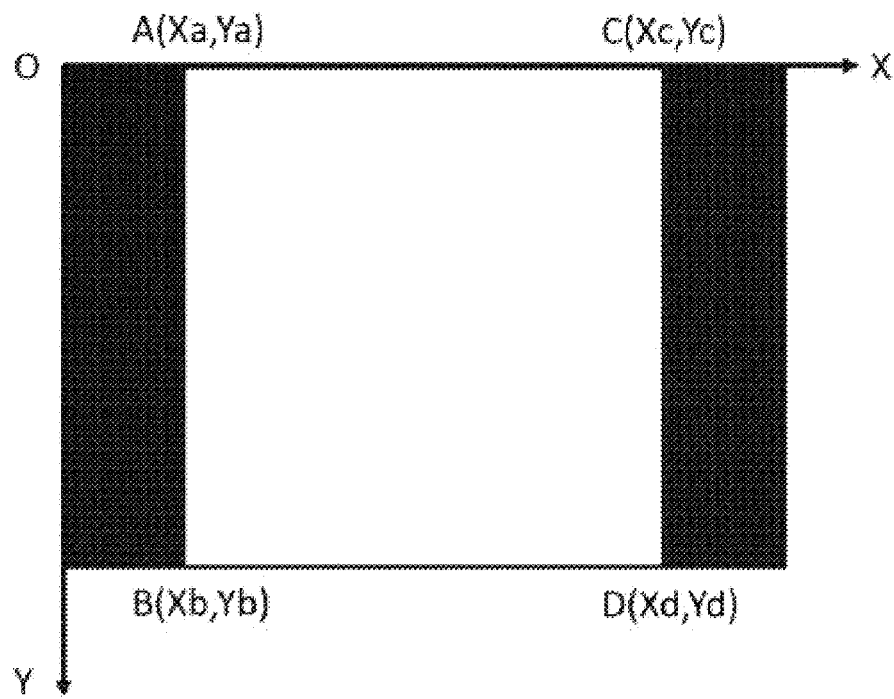
FIG. 6 is a third schematic view of a target region of the display screen adjustment method in an embodiment of this disclosure.

In this embodiment, as shown in FIG. 2 and FIG. 3, the target region is a non-overlapping region between an image region and the display screen in the display preview picture. And the color value of each of the pixel points in the target region is a default value (for example, the default value is 0x00000000, and 0x00000000 represents black), and the image region is a region for displaying image content. In addition, the display preview picture is a symmetrical scale picture, so that the non-overlapping region between the image region and the display screen in the display preview picture includes sub-non-overlapping regions arranged symmetrically. Thus, the target region includes one set of sub-region groups at least, each sub-region group includes two sub-regions, and the two sub-regions are respectively located on two sides of the image region and are arranged symmetrically. Wherein, the sub-region group may be one group or two groups. When the sub-region group is one group, the target region may include two sub-regions, and the two sub-regions are respectively located on both sides of the image region and arranged symmetrically, the two sub-regions include part of the borders of the display preview picture at least, and the color values of each of the pixel points in each sub-region are equal to the default value. Wherein, the symmetry may be center symmetry or axial symmetry. For example, as shown in FIG. 4 and FIG. 5, the two sub-regions serve as the left and right sides of the image region, and the two sub-regions are centrally symmetrical. For another example, as shown in FIG. 6, the two sub-regions are located on the left and right sides of the image region, and the two sub-regions are symmetrical. Alternatively, as shown in FIG. 7, the two sub-regions are located on an upper side and a lower side of the image region, and the two sub-regions are symmetrical. When there are two groups of sub-regions, the target region may be four sub-regions, and the sub-regions on the opposite sides of the four sub-regions on which the display preview picture are centrally symmetrical.

Further, since the color values of the pixel points in the target region are all equal to the preset value, and the target region is located outside of the image region, so that it can determine a vertex of the target region and then determine the target region according to the vertex by starting from a vertex of the displayed preview picture, and traversing along an edge of the displayed preview picture. Correspondingly, in an implementation manner of this embodiment, as shown in FIG. 8, the process of acquiring the target region of the display preview picture specifically includes:

S11. select a number of starting pixel points of the display preview picture, the starting pixel points are intersections of a horizontal line and a vertical line in the display preview picture, and the color values of the starting pixel points are equal to the default value.

Specifically, the starting pixel points are the vertices of the display preview picture, that is, the starting pixel points are the intersections of the horizontal line and the vertical line in the display preview picture. For example, as shown in FIG. 2, the vertices of the display preview picture are respectively pixel point 1, pixel point 2, pixel point 3 and pixel point 4. Then select the pixel point whose color value is the default value among pixel point 1, pixel point 2, pixel point 3 and pixel point 4 as the starting pixel points. If select the pixel point whose color value is not the default value, it is determined that the display preview picture is the carrying target region. If a pixel point with the color value being equal to the default value is selected, the number of pixel points selected is determined. When the number is 1, the pixel point is used as the starting pixel point. When the number is greater than 1, one pixel point is randomly selected from the pixel points selected as the starting pixel point. For example, if the color values of pixel point 1 and pixel point 3 are both the default value, the pixel point 1 may be selected as the starting pixel point.

S12. determine a first pixel point in a clockwise direction and a second pixel point in a counterclockwise direction according to starting from the starting pixel points, traverse an edge of the display preview picture in the clockwise direction and the counterclockwise direction with a preset step size, the color value of the first pixel point and the color value of the second pixel point are equal to the default value, the color value of a next pixel point of the first pixel point on the side of the display preview picture and the color value of a next pixel point of the second pixel point on the side of the display preview picture are not equal to the default value either.

Specifically, the preset step size is preset, and is used to limit the number of pixel points that are moved in each traversal. The edge of the display preview picture refers to the formation of the outermost pixel points of the to-be-displayed image. For example, if the resolution of the display screen is 1920*1080, then the line formed by the pixel point (0,0), . . . , the pixel point (0,i), . . . , the pixel point (0,1920) is the edge of the display preview picture, where i is a positive integer and 0<i<1920. The clockwise traversal and the counterclockwise traversal may be performed synchronously, or may be performed separately, for example, the clockwise traversal is performed first, and then the counterclockwise traversal is performed, or the counterclockwise traversal is performed first, and then the clockwise traversal is performed. The next pixel point of the first pixel point refers to the pixel point located behind the first pixel point according to the traversing direction, and the next pixel point of the first pixel point is located on the edge of the display preview picture. The next pixel point of the second pixel point refers to a pixel point located behind the second pixel point according to the traversing direction, and the next pixel point of the second pixel point is located on the edge of the display preview picture. For example, as shown in FIG. 3, taking the pixel point in an upper left corner of the display preview picture as the starting pixel point, and recording the starting pixel point as pixel (0, 0) as the starting pixel point, then traversing the edge in the clockwise direction with the step size of 1, the next pixel point of the starting pixel point (0,0) is the pixel point (1,0). Traversing the edge in the counterclockwise direction with the step size of 1, and the next pixel point of the starting pixel point (0,0) is (0,1).

Further, in order to specifically describe the determination process of the first pixel point and the second pixel point, a specific implementation manner is described herein. In this implementation, it is assumed that the default value is 0x00000000 (black), the resolution of the display screen is 1920*1080, the upper left corner of the display preview picture is displayed as the coordinate origin, a vertical downward direction is the positive direction of the Y axis, and a horizontal right direction is the positive direction of the X axis. Then the four sides of the display preview picture are divided into x=0, x=1920, y=0 and y=1080, and the four vertices of the display preview picture are (0,0), (0,1080), (1920,0) and (1920, 1080). Herein, the color value of vertex (0,0) is the default value (the vertex is black), and the vertex (0,0) is the starting pixel point. By traversing the pixel points on the four sides with the step size of 1 in the clockwise and counterclockwise directions, the following four situations can be acquired:

A first situation: as shown in FIG. 3, the first pixel point A is on the X axis, the second pixel point B is on the Y axis. The color values of all boundary pixel points from the starting pixel point O to the first pixel point A ($X_a$, $Y_a$) are default value. That is, $Y_a$=0, and the pixel points in the [0, Xa] interval are all black. When the second pixel point B is on the Y axis, it means that the color values of all boundary pixel points from the starting pixel point O to the second pixel point B (Xb, Yb) are all default value. That is, Xb=0, the pixel points in the [0, Yb] interval are all black. Therein, 0<Xa<1920, Yb<=1080.

A second situation: as shown in FIG. 4, the first pixel point A is on the starting pixel point O, and the second pixel point B is on the Y=1080 axis. The color values of all boundary pixel points from the starting pixel point O to the pixel point (0, 1080), and the color values of all boundary pixel points from the pixel point (0, 1080) to the second pixel point B (Xb, Yb) are default value, that is Xb=0, the pixel points in the [0, 1080] interval are all black, and Yb=1080, the pixel points in the [0, Xb] interval are all black, where the first pixel point is the starting pixel point.

A third situation: as shown in FIG. 5, the first pixel point A is on the X axis, the second pixel point is on y=1080 axis. And the color values of all boundary pixel points from the starting pixel point O to the first pixel point A (Xa, Ya) are default value, that is, Ya=0, and the pixel points in the [0, Xa] interval are all black. The color values of all boundary pixel points from the starting pixel point O to the pixel point (0, 1080), and the color values of all boundary pixel points from the pixel point (0, 1080) to the second pixel point B (Xb, Yb) are default value, that is Xb=0, the pixel points in the [0, 1080] interval are all black, and Yb=1080, the pixel points in the [0, Xb] interval are all black, and Xa=Xb.

A fourth situation: As shown in FIG. 6, the first pixel point A is on the Y axis, the second pixel point B is on the X=1920 axis. And the color values of all boundary pixel points from the starting pixel point O to the pixel point (1920, 0), and the color values of all boundary pixel points from the pixel point (1920, 0) to the second pixel point B (1920, Ya) are default value, that is Ya=0, the pixel points in the [0, 1920] interval are all black, and Xa=1920, the pixel points in the [0, Ya] interval are all black. The color values of all boundary pixel points from the starting pixel point O to the second pixel point B (Xb, Yb) are default value, that is, Xb=0, the pixel points in the [0, Yb] interval are all black, and Ya=Yb.

S13. determine the target region according to the first pixel point and the second pixel point.

Specifically, the target region includes one group of sub-region groups at least, each group of sub-region groups includes two sub-region groups, and the two sub-region groups are arranged symmetrically around the center. Among them, a sub-region in a sub-region group is an area enclosed by a connection line with a first pixel point and a second pixel point, an edge traversing when acquiring the first pixel point and an edge traversing when acquiring the second pixel point. Another sub-region in the sub-region group is a center symmetric sub-region of the sub-region mentioned above. During the process of determining the target region according to the first pixel point and the second pixel point, a sub-region of the target region is determined according to the first pixel point and the second pixel point. Another sub-region will then be determined based on the symmetry of the two sub-regions. For example, as shown in FIG. 4, the first pixel point is A and the second pixel point B, then the sub-region determined according to the first pixel point and the second pixel point is a triangle AOB, and then taking a center of the display preview picture as the center of symmetry, the symmetrical triangle CDE of the triangle AOB can be determined, thereby determining the target region. Assuredly, it is worth noting that when calculating the target region in this embodiment, only one sub-region in the target region is required to be calculated, and a display scale and a display angle can be subsequently calculated according to the sub-region.

Further, in this embodiment, after acquiring the first pixel point and the second pixel point, the process of determining the target region according to the first pixel point and the second pixel point includes: determining whether the first pixel and the second pixel pass through a number of vertices of the display preview picture. When non-passing through one of the vertices of the display preview picture, a right triangle formed by the starting pixel point, the first pixel point, and the second pixel point with a line connecting the first pixel point and the second pixel point as the hypotenuse is taken as a sub-region of the target region. And when passing through one of the vertices of the display preview picture, an rectangle with the starting pixel, the first pixel, the second pixel and the passed vertex as vertices is taken as a sub-region of the target region. Wherein, the first pixel point and the second pixel point of the non-passing through means that neither of the first pixel point nor the second pixel point passes through, and the passing-through means that the first pixel point or the second pixel point passes through.

Further, in this embodiment, the process of determining the target region according to the first pixel point and the second pixel point specifically includes:

M10. determine a candidate region according to the first pixel point and the second pixel point, and traversing the color values of each of a number of pixel points in the candidate region;

M20. when the color values of all the pixel points included in the candidate region are the default value, taking the candidate region as the target region;

M30. when a pixel point whose color value is not equal to the default value exists in the candidate region, performing an operation of selecting the starting pixel point of the display preview picture.

Specifically, after acquiring the first pixel point and the second pixel point, and determining the candidate region according to the first pixel point and the second pixel point, and detecting the color value of each of the pixel points in the candidate region (for example, the triangle OAB area in FIG. 4) to determine whether the color values of all the pixel points in the candidate region are equal to the default value. When the color values of all pixel points in the candidate region are equal to the default value, the candidate region is determined to be valid, and the candidate region is taken as a sub-region of the target region. When there are pixel points whose color values are not equal to the default value in the candidate region, it is determined that the candidate region is invalid, and the operation of selecting the starting pixel point of the display preview picture is continued until the first pixel point and the second pixel point are selected to determine that the candidate region can be taken as a sub-region of the target region.

For example: As shown in FIG. 4 and FIG. 5, it can be concluded that slope of a straight line AB is a K value, where the expression of the K value can be:

$$K = \frac{Ya - Yb}{Xa - Xb}$$

Since the display preview picture is a symmetrical scale picture, the slope of a straight line CD is a same as that of the straight line AB. At this time, by traversing the pixel points in an area formed by AB/CD and a picture boundary, if all are black, that is, the color value is 0x00000000, then it is considered that the black border scale is effective. Wherein, the process of traversing AB can be: In this scene, point B is always below point A, that is, Ya<Yb, y∈[Ya, Yb], traversing each line of the display preview picture one by one until a corresponding boundary point of the line. When the color values of all the pixel points from each row to its boundary points are all default value, the target region is determined to be an effective region. Among them, the corresponding boundary point of each row is determined according to the straight line AB. For each row, since the boundary points of the row are distributed on the straight line y=Kx, and y∈[Ya, Yb], then $$x = \frac{y}{k}.$$

Then a number of coordinates of the boundary points (x, y) are acquired, that is, the line starts from (0, y) to an end of (x, y) when traversing. The process of traversing a CD area may be as follows: in this scene, point D is always below point C, that is, Yc<Yd, y∈[Yc,Yd], and then traversing each line of the display preview picture one by one to acquire a number of traversal boundary points, since the boundary points are distributed on the straight line y=Kx, and y∈[Yc, Yd], and then.

$$x = \frac{y}{k}.$$

Then a number of coordinates of the boundary points (x, y) are acquired, that is, the line starts from (x, y) to an end of (1920, y) when traversing. And when y is traversed from Yc to Yd, each line is completed.

S20. determine the display angle and the display scale corresponding to the display preview picture according to the target region.

Specifically, the display angle refers to the inclination angle of the connecting line between the first pixel point and the second pixel point in a sub-region of the target region with respect to the vertical direction. The display scale refers to the side length scale of the adjacent sides of the image region. For example, the image region is a parallelogram, and the parallelogram is composed of side a, side b, side c, and side d, respectively. Side a is parallel to side c, and side b is parallel to side d, then the display scale is the scale of side a to side b. For another example, as shown in FIG. 4, the display scale is the scale of the side AB to the side AC. Wherein, the image region is a region used to display the image content corresponding to the video signal in the display preview picture. The image region is located in the center of the display preview picture. The target region is located at the periphery of the image region, and the target region and the image region constitute the display preview picture. The target region is adjacent to the image region, and the target region and the image region have intersecting edges such that the image region and sub-regions of the target region have intersecting edges.

Figure 9:
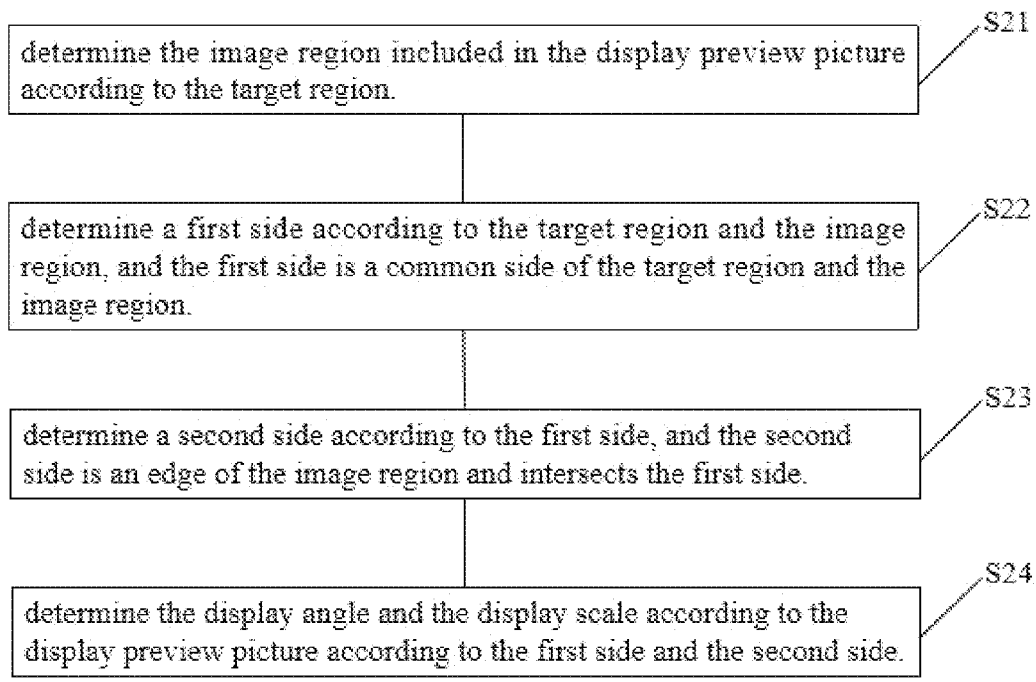
FIG. 9 is a flowchart of step S20 of the display screen adjustment method in an embodiment of this disclosure.

Further, in this embodiment, as shown in FIG. 9, the process of determining the display angle and the display scale corresponding to the display preview picture according to the target region specifically includes:

S21. determine an image region included in the display preview picture according to the target region;

S22. determine a first side according to the target region and the image region, wherein the first side is a common side of the target region and the image region;

S23. determine a second side according to the first side, wherein the second side is a side of the image region and intersects with the first side;

S24. determine the display angle and display scale corresponding to the display preview picture according to the first side and the second side.

Specifically, the display angle is a display angle of the image region, and the display angle of the image region refers to the inclination angle of the image region with respect to a longitudinal direction. The process of determining the image region included in the display preview picture according to the target region refers to determining the image region according to the first pixel point and the second pixel point corresponding to each sub-region included in the target region. Wherein, the image region is a parallelogram with the first pixel point and the second pixel point corresponding to each sub-region as vertices. For example, as shown in FIG. 4, the image region is a parallelogram formed by pixel A, pixel B, pixel C, and pixel E. In addition, after determining the image region, an intersection edge of a sub-region of the target region and the image region is determined. For example, as shown in FIG. 4, a sub-region of the target region is a triangle AOB, and the image region is a parallelogram ABEC, then the intersecting edge of the sub-region and the image region is AB, that is, the edge AB is the first side.

Further, the second side is a side of the image region, and the second side intersects the first side. The color value of the intersection of the second side and the first side is equal to the default value, and the color value of the pixel point adjacent to the intersection on the second side is not equal to the default value. For example, as shown in FIG. 4, the first side is AB, and the second side is AC. In addition, after determining the first side and the second side, the display angle and display scale corresponding to the display preview picture are determined according to the first side and the second side. Wherein, the display angle is equal to an inclination angle of the first side, and the display scale is equal to the scale of the first side and the second side.

Further, in this embodiment, the process of determining the display angle and display scale corresponding to the display preview picture according to the first side and the second side specifically includes:

Calculate the length scale of a first length to a second length and the inclination angle of the first side;

The length scale is taken as the display scale of the display preview picture, and the inclination angle is taken as the display angle corresponding to the display preview picture.

Specifically, the inclination angle is an angle between the first side and the Y-axis, and the display scale is the scale of the length of the second side to the first side, so when determining the display scale, the length of the first side and the length of the second side may be calculated first, and then the scale of the first side to the second side may be determined. For example, two endpoints of the first side are a pixel point A (Xa, Ya) and a pixel point B (Xb, Yb), respectively. And two endpoints of the second side are a pixel point A (Xa, Ya) and a pixel point C (Xc, Yc), then the expression of the length of the first side AB is: AB= $\sqrt{(Xa-Xb)^2+(Ya-Yb)^2}$. The expression of the length of the second side AC is: AC=$\sqrt{(Xa-Xc)^2+(Ya-Yc)^2}$. Correspondingly, the expression of the display scale S is:

$$S = \frac{AB}{AC} = \frac{\sqrt{(Xa-Xb)^2 + (Ya-Yb)^2}}{\sqrt{(Xa-Xc)^2 + (Ya-Yb)^2}}$$

The expression of the display angle can be:

$$\alpha = \tan^{-1}\left|\frac{Xa-Xb}{Ya-Yb}\right|$$

For example, as shown in FIG. 4, the display angle is α, as shown in FIG. 5, the display angle is 180°−α, as shown in FIG. 6, the display angle is 0°, as shown in FIG. 7, the display angle is 90°.

S30. determine a rotation angle of the display screen according to the display angle and the display scale, and adjusting the display screen according to the rotation angle.

Specifically, the rotation angle is a rotation angle of the display screen, and the adjustment of the display screen may be a rotation mechanism configured by the terminal device for rotating the display screen. The rotation mechanism automatically rotates the display screen according to the rotation angle, so that the image region in a display picture displayed in the display screen matches the display screen.

In addition, when the display screen is adjusted according to the rotation angle, the display screen is rotated in an opposite direction of the display screen rotation direction, so as to ensure that a display direction of the display picture of the display screen remains unchanged, which can reduce the target region (eg, a black border region) in the display picture displayed on the display screen to increase the image region.

Further, in an implementation manner of this embodiment, the process of determining the rotation angle of the display screen according to the display angle and the display scale specifically includes:

when the display angle is equal to a first angle threshold, comparing a screen scale of the display screen with a scale threshold;

when the screen scale is greater than the scale threshold, the rotation angle is the first angle threshold, wherein a second angle threshold is smaller than the first angle threshold;

when the screen scale is smaller than or equal to the scale threshold, the rotation angle is determined according to the display scale and the screen scale, wherein the display scale is greater than or equal to a inverse of the screen scale, the rotation angle is the first angle threshold; the display scale is smaller than the inverse of the screen scale, and the rotation angle is the second angle threshold.

Specifically, the screen scale is the scale of a horizontal side to a vertical side of the display screen, the first angle threshold and the second angle threshold are preset, and the second angle threshold is greater than the first angle threshold, and the difference between the second angle threshold and the first angle threshold is equal to 90°. In a possible implementation manner of this embodiment, the first angle threshold is 0°, and the second angle threshold is 90°. The screen scale is the display scale when the display screen is not adjusted (for example, 16:9, etc.), the scale threshold is the default value of the display screen scale, and in an embodiment, the scale threshold is 1. For example, the first angle threshold is 0°, the second angle threshold is 90°, the scale threshold is 1, the display angle is 0°, the display scale is 4:3, and the screen scale is 9:16. Then, the screen scale is smaller than the scale threshold, and the display scale 4:3 is smaller than the inverse of the screen scale 16:9, so the rotation angle is 0°.

Further, in an implementation manner of this embodiment, the process of determining the rotation angle of the display screen according to the display angle and the display scale further includes:

when the display angle is smaller than the first angle threshold and greater than the second angle threshold, comparing the display scale with the screen scale;

when the display scale is greater than or equal to the screen scale, the rotation angle is the display angle;

when the display scale is smaller than the screen scale, the rotation angle is the first angle threshold minus the display angle.

For example: the first angle threshold is 0°, the second angle threshold is 90°, the scale threshold is 1, the display angle is 30°, the display scale is 4:3, the screen scale is 9:16. Then the display scale of 4:3 is greater than the screen scale of 9:16, so the rotation angle is 30°.

Further, in an implementation manner of this embodiment, the process of determining the rotation angle of the display screen according to the display angle and the display scale further includes:

when the display angle is equal to the second angle threshold, comparing the screen scale with a scale threshold;

when the screen scale is smaller than or equal to the scale threshold, the rotation angle is the first angle threshold;

when the screen scale is greater than the scale threshold, the display screen is adjusted according to the display scale and the screen scale, wherein the display scale is greater than or equal to the inverse of the screen scale, and the rotation angle is the first angle threshold; the display scale is smaller than the inverse of the screen scale, and the rotation angle is the second angle threshold.

For example, the first angle threshold is 0°, the second angle threshold is 90°, the scale threshold is 1, the display angle is 90°, the display scale is 1:2, and the screen scale is 16:9. Then, the screen scale of 16:9 is greater than the scale threshold, and the display scale of 1:2 is smaller than the inverse of the screen scale of 9:16, so the rotation angle is 90°.

In summary, in this disclosure, the target region is determined by the display preview picture, and the display angle and the display scale are determined according to the target region to determine the rotation angle. In this way, the scale of a finally output picture can be determined according to a data signal corresponding to the display preview picture, such that the scale of the output picture is adapted to the display screen, thus improving the display effect. Moreover the display angle is determined according to the target region, and the rotation angle is then determined according to the display angle, such that the display screen can be adapted to switching at different angles, the display screen is at an optical display angle, and the terminal device can be adapted to application scenarios of different display scales.

Based on the display screen adjustment method mentioned above, this embodiment provides a computer-readable storage medium, where the computer-readable storage medium stores one or more programs. The one or more programs may be executed by one or more processors to implement the steps in the display screen adjustment method according to the above embodiment.

Figure 10:
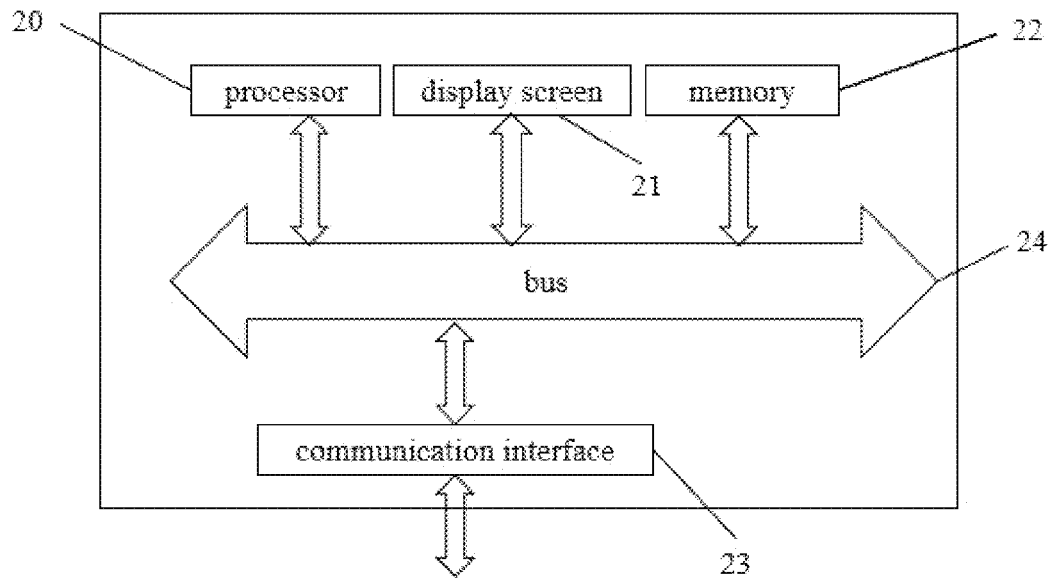
FIG. 10 is a schematic structural view of a terminal device in an embodiment of this disclosure.

Based on the display screen adjustment method mentioned above, this disclosure also provides the terminal device, as shown in FIG. 10, which includes one processor 20 at least; a display screen 21; and a memory 22, which may also include communication interface (Communications Interface) 23 and bus 24. The processor 20, the display screen 21, the memory 22 and the communication interface 23 can communicate with each other through the bus 24. The display screen 21 is set to display a user guide interface preset in the initial setting mode. The communication interface 23 can transmit information. The processor 20 may invoke logic instructions in the memory 22 to perform the display screen adjustment method in the above-described embodiment.

In addition, a number of logic instructions in the memory 22 above-mentioned can be implemented in the form of software functional units and can be stored in the computer-readable storage medium when sold or used as an independent product.

As a computer-readable storage medium, the memory 22 may be configured to store software programs, computer-executable programs, such as program instructions or modules corresponding to the display screen adjustment method in the embodiment of this disclosure. The processor 20 executes functional applications and data processing by running the software programs, instructions or modules stored in the memory 22, ie, implements the display screen adjustment method in the above embodiment.

The memory 22 may include a storage program area and a storage data area, wherein the storage program area may store an operating system, and an application program required for at least one function; the storage data area may store data created according to the use of the terminal device. Additionally, memory 22 may include high-speed random access memory, and may also include non-volatile memory. For example, U disk, mobile hard disk, read-only memory (Read-Only Memory, ROM), random access memory (Random Access Memory, RAM), magnetic disk or optical disk and other media that can store program codes, or temporary state storage medium.

In addition, the specific process of loading and executing the above-mentioned storage medium and the multiple instruction processor in the terminal device has been described in detail in the above-mentioned method, and will not be described one by one herein.

Finally, it should be noted that the above embodiment are only used to illustrate the technical solutions of this disclosure, but not to limit them; although this disclosure has been described in detail with reference to the foregoing embodiment. Those of ordinary skill in the art should understand that: they can still make modifications to the technical solutions described in the foregoing embodiment, or perform equivalent replacements to some of the technical features; and these modifications or replacements. The essence of the corresponding technical solutions does not deviate from the spirit and scope of the technical solutions of the embodiment of this disclosure.

What is claimed is:

1. A display screen adjustment method, comprising:
   acquiring a target region of a display preview picture, wherein the display preview picture is a display picture formed by outputting a to-be-displayed image to a display screen, the target region is a non-overlapping region between an image region and the display screen in the display preview picture, and a color value of each pixel point in the target region is equal to a default value;
   determining a display angle and a display scale corresponding to the display preview picture according to the target region;
   determining a rotation angle of the display screen according to the display angle and the display scale; and
   adjusting the display screen according to the rotation angle;
   wherein the process of acquiring the target region of the display preview picture comprises:
   selecting a plurality of starting pixel points of the display preview picture, the starting pixel points are intersections of a horizontal line and a vertical line in the display preview picture, and the color values of the starting pixel points are equal to the default value;
   determining a first pixel point in a clockwise direction and a second pixel point in a counterclockwise direction according to starting from the starting pixel points, traversing an edge of the display preview picture in the clockwise direction and the counterclockwise direction with a preset step size, the color value of the first pixel point and the color value of the second pixel point are equal to the default value, the color value of a next pixel point of the first pixel point on a side of the display preview picture and the color value of a next pixel point of the second pixel point on the side of the display preview picture are not equal to the default value; and
   determining the target region according to the first pixel point and the second pixel point.

2. The display screen adjustment method as claim in claim 1, wherein the target region comprises a set of sub-region groups at least, each sub-region group comprises two sub-regions, the two sub-regions are symmetrically distributed on both sides of the image region.

3. The display screen adjustment method as claimed in claim 1, wherein the to-be-displayed image comprises a frame image acquired by analyzing a video signal, and the display preview picture comprises a preview picture acquired by intercepting the frame image corresponding to the to-be-displayed image in a frame buffer.

4. The display screen adjustment method as claimed in claim 1, wherein the color value includes a transparency, a red channel value, a green channel value, and a blue channel value.

5. The display screen adjustment method as claimed in claim 1, wherein the next pixel point of the first pixel point comprises a first pixel point located after the first pixel point according to a traversing direction, and the next pixel point of the first pixel point is located on the side of the display preview picture; and the next pixel point of the second pixel point comprises a first pixel point located after the second pixel point according to the traversing direction, and the next pixel point of the second pixel point is located on the side of the display preview picture.

6. The display screen adjustment method as claimed in claim 1, wherein the process of determining the target region according to the first pixel point and the second pixel point comprises:
   determining a candidate region according to the first pixel point and the second pixel point, and traversing all color values of each pixel points in the candidate region;
   taking the candidate region as the target region when the color values of all the pixel points included in the candidate region are default values; and
   performing the process of selecting the starting pixel points of the display preview picture when there is a pixel point whose color value is not equal to the default value in the candidate region.

7. The display screen adjustment method as claimed in claim 6, wherein the process of determining a candidate region according to the first pixel point and the second pixel point comprises:
   determining whether the first pixel point and the second pixel point pass through a plurality of vertices of the display preview picture;
   when neither the first pixel point nor the second pixel point passes through one of the vertices of the display preview picture, a right triangle with the starting pixel point, the first pixel point and the second pixel point as vertices is taken as the candidate region; and
   when the first pixel point or the second pixel point passes through one of the vertices of the display preview picture, an rectangle with the starting pixel point, the first pixel point, the second pixel point and the passed vertex as vertices is taken as the candidate region.

8. The display screen adjustment method as claimed in claim 1, wherein the display angle comprises a inclination angle of a connecting line of the first pixel point and the second pixel point in a sub-region of the target region with respect to a longitudinal direction.

9. The display screen adjustment method as claimed in claim 1, wherein the display scale comprises the side length scale of adjacent sides in the image region of the display preview picture.

10. The display screen adjustment method as claimed in claim 1, wherein the process of determining a display angle and a display scale corresponding to the display preview picture according to the target region comprises:
    determining the image region included in the display preview picture according to the target region;
    determining a first side according to the target region and the image region, and the first side is a common side of the target region and the image region;
    determining a second side according to the first side, and the second side is an edge of the image region and intersects the first side; and
    determining the display angle and the display scale according to the display preview picture according to the first side and the second side.

11. The display screen adjustment method as claimed in claim 1, wherein the process of determining the rotation angle of the display screen according to the display angle and the display scale comprises:
    when the display angle is equal to a first angle threshold, comparing a screen scale of the display screen with a scale threshold;
    when the screen scale of the display screen is greater than the scale threshold, the rotation angle is the first angle threshold, wherein a second angle threshold is smaller than the first angle threshold;
    when the screen scale is smaller than or equal to the scale threshold, determining the rotation angle according to the display scale and the screen scale, the display scale is greater than or equal to an inverse of the screen scale, the rotation angle is the first angle threshold, the display scale is smaller than the inverse of the screen scale, and the rotation angle is the second angle threshold.

12. The display screen adjustment method as claimed in claim 11, wherein the second angle threshold is greater than the first angle threshold, and a difference between the second angle threshold and the first angle threshold is equal to 90°.

13. The display screen adjustment method as claimed in claim 1, wherein the process of determining the rotation angle of the display screen according to the display angle and the display scale comprises:
    when the display angle is smaller than a first angle threshold and greater than a second angle threshold, comparing the display scale with a screen scale;
    when the display scale is greater than or equal to the screen scale, the rotation angle is the display angle; and
    when the display scale is smaller than the screen scale, the rotation angle is the first angle threshold minus the display angle.

14. The display screen adjustment method as claimed in claim 1, wherein the process of determining the rotation angle of the display screen according to the display angle and the display scale comprises:
    when the display angle is equal to a second angle threshold, comparing a screen scale to a scale threshold;
    when the screen scale is smaller than or equal to the scale threshold, the rotation angle is a first angle threshold; and
    when the screen scale is greater than the scale threshold, the display screen is adjusted according to the display scale and the screen scale, the display scale is greater than or equal to an inverse of the screen scale, the rotation angle is the first angle threshold, the display scale is smaller than the inverse of the screen scale, and the rotation angle is the second angle threshold.

15. A non-transitory computer-readable storage medium, wherein the non-transitory computer-readable storage medium stores one or more programs, and the one or more programs can be executed by one or more processors to perform operations comprising:
    acquiring a target region of a display preview picture, wherein the display preview picture is a display picture formed by outputting a to-be-displayed image to a display screen, the target region is a non-overlapping region between an image region and the display screen in the display preview picture, and a color value of each pixel point in the target region is equal to a default value;
    determining a display angle and a display scale corresponding to the display preview picture according to the target region;
    determining a rotation angle of the display screen according to the display angle and the display scale; and
    adjusting the display screen according to the rotation angle;
    wherein the process of acquiring the target region of the display preview picture comprises:
    selecting a plurality of starting pixel points of the display preview picture, the starting pixel points are intersections of a horizontal line and a vertical line in the display preview picture, and the color values of the starting pixel points are equal to the default value;
    determining a first pixel point in a clockwise direction and a second pixel point in a counterclockwise direction according to starting from the starting pixel points, traversing an edge of the display preview picture in the clockwise direction and the counterclockwise direction with a preset step size, the color value of the first pixel point and the color value of the second pixel point are equal to the default value, the color value of a next pixel point of the first pixel point on a side of the display preview picture and the color value of a next pixel point of the second pixel point on the side of the display preview picture are not equal to the default value; and
    determining the target region according to the first pixel point and the second pixel point.

16. A terminal device, comprising: a processor, a memory and a communication bus; a computer-readable program executable by the processor is stored on the memory;
  the communication bus implements connection communication between the processor and the memory; and
  when the processor executes the computer-readable program to perform operations comprising:
  acquiring a target region of a display preview picture, wherein the display preview picture is a display picture formed by outputting a to-be-displayed image to a display screen, the target region is a non-overlapping region between an image region and the display screen in the display preview picture, and a color value of each pixel point in the target region is equal to a default value;
  determining a display angle and a display scale corresponding to the display preview picture according to the target region;
  determining a rotation angle of the display screen according to the display angle and the display scale; and
  adjusting the display screen according to the rotation angle:
  wherein the process of acquiring the target region of the display preview picture comprises:
  selecting a plurality of starting pixel points of the display preview picture, the starting pixel points are intersections of a horizontal line and a vertical line in the display preview picture, and the color values of the starting pixel points are equal to the default value:
  determining a first pixel point in a clockwise direction and a second pixel point in a counterclockwise direction according to starting from the starting pixel points, traversing an edge of the display preview picture in the clockwise direction and the counterclockwise direction with a preset step size, the color value of the first pixel point and the color value of the second pixel point are equal to the default value, the color value of a next pixel point of the first pixel point on a side of the display preview picture and the color value of a next pixel point of the second pixel point on the side of the display preview picture are not equal to the default value; and
  determining the target region according to the first pixel point and the second pixel point.

* * * * *